United States Patent [19]

Heiman et al.

[11] Patent Number: 5,187,031
[45] Date of Patent: Feb. 16, 1993

[54] ANTI-VIBRATION PLAQUE FOR A BATTERY

[75] Inventors: Jerome R. Heiman, Milwaukee; Jack Bruss, Elm Grove, both of Wis.

[73] Assignee: Globe-Union Inc., Milwaukee, Wis.

[21] Appl. No.: 741,381

[22] Filed: Aug. 7, 1991

[51] Int. Cl.[5] .................. H01M 2/10; H01M 2/14; H01M 2/22
[52] U.S. Cl. .................. 429/129; 429/66; 429/176; 429/177; 429/247
[58] Field of Search ............... 429/66, 129, 247, 176, 429/177

[56] References Cited

U.S. PATENT DOCUMENTS

| | | | |
|---|---|---|---|
| 576,178 | 2/1897 | Willard | 429/66 |
| 4,262,068 | 4/1981 | Kono et al. | 429/247 |
| 4,939,047 | 7/1990 | Nagashima | 429/66 |
| 5,030,524 | 7/1991 | Stadnick et al. | 429/66 |
| 5,034,290 | 7/1991 | Sands et al. | 429/247 |

Primary Examiner—Olik Chaudhuri
Assistant Examiner—M. Nuzzolillo
Attorney, Agent, or Firm—Thomas E. Valentyn; E. L. Levine; Joseph E. Root, III

[57] ABSTRACT

A flat, rigid sheet of predetermined configuration is provided for insertion between each end cell element and the corresponding container end wall of a battery during production line manufacturing. The battery is thus protected from the harmful effects resulting from the flexing of the container end walls due to oscillating hydraulic pressure of the electrolyte contained within the outermost cells of the battery.

12 Claims, 2 Drawing Sheets

ANTI-VIBRATION PLAQUE FOR A BATTERY

BACKGROUND OF THE INVENTION

1. Field of the Invention

This invention relates generally to a vehicle battery which contains an article of manufacture which diminishes the effects of vibration on the useful life of said battery and, more particularly, to a plaque which is inserted during manufacture between the end cell element and the container end wall on each end of the battery to protect the end cell element from the flexing of the container end wall.

2. Description of the Prior Art

The fact that vibration reduces the useful life of a vehicle battery is well known. With the ever-increasing need and desire for vehicles which can be used for a variety of transportation needs from heavy-duty moving and hauling, both off-road and over the highway, to recreational travel, including marine applications, there is a need for the vehicle battery to withstand a much greater degree of vibration in order to ensure a satisfactory useful life.

Traditionally, protection from the effects of vibration in batteries has been accomplished by anchoring the elements of the battery to the bottom of the container by means of a layer of epoxy or "hot melt." Nevertheless, a particularly damaging mode of vibration in thin-walled polypropylene batteries exists despite the use of the epoxy anchoring method. It is the flexing in and out of the battery container end walls due to the varying hydraulic pressure of the electrolyte contained within the outermost cells. The oscillating hydraulic pressure is induced by the positive and negative "G" forces of the dynamic motion environment in which the battery operates. This phenomenon is commonly referred to as "oil canning." When the end walls of the battery container flex, the plates next to the end walls also flex and the lugs can eventually become detached from the straps, resulting in element imbalance which rapidly causes additional damage to the battery. The lugs and straps are the structural and electrical interconnections of the battery elements. Additionally, anchoring the battery elements with epoxy or "hot melt" can be a messy and labor intensive process leading to increased manufacturing costs.

The assignee of this application previously manufactured a model EV2300 battery which contained "reinforcement sheets" inserted between the end cell elements and the container walls to achieve 7 to 8% compression of all battery elements within the container, thereby increasing the electrical cycle life. The reinforcement sheets also improved handling characteristics (e.g. carrying, packing, stacking, etc.) of the battery. They were made out of polyphenylene sulfide and had a flexural modulus of greater than 1,000,000 psi. The flexural modulus is a measure of the stiffness of a material derived from ASTM test #D790-86. Greater stiffness will result in a higher flexural modulus. The EV2300 battery was never tested for compliance with the SAE "Off-Road" Vibration Specifications (J930), testing which subjects the battery to conditions of excessive vibration. Nevertheless, it is believed that the EV2300 reinforcement sheets would have been successful in reducing the effects of vibration to some degree.

The EV2300 reinforcement sheets were in the shape of the battery elements themselves, covering only that area of battery container walls below the straps extending across the elements. The substantial area of the container wall above the top edge of the elements was not reinforced. Also, installation of these sheets required expensive off-production line manufacturing, because the last element inserted into the battery had to be tapped in with a mallet in order to attain the compression necessary to achieve the desired effects. The EV2300 battery was, therefore, not extensively produced or marketed.

It is therefore desirable to provide a vehicle battery which alleviates the structural wear occurring in the dynamic operating environment and which is easier to manufacture than prior batteries.

SUMMARY OF THE INVENTION

This invention provides a readily manufacturable battery which operates in the high vibration environment experienced in many vehicles. In a preferred embodiment, the invention includes a flat, rigid anti-vibration plaque having the shape of the end wall of the battery with at least one rectangular cutout along the top edge to prevent contact with any straps which connect the outermost elements. In most batteries, the plaque has a thickness of 0.125 inches ±0.005 inches. The plaque is preferably at least 0.025 inches but not more than 0.075 inches greater in thickness than the space into which it is inserted, except for the bottom edge which tapers inwardly from each vertical face of the plaque. These design requirements ensure that an "interference fit" will be achieved. Consequently, when inserted between each of the two end cell elements and its corresponding container end wall, the plaque significantly reduces the effects of vibration on the battery and enables the battery to pass the SAE "Off-Road" Vibration Specifications (J930) without the need for epoxy or any other method of fixing the elements in place. Insertion of the plaque can be accomplished during manufacture without compromising production efficiency.

BRIEF DESCRIPTION OF THE DRAWING

The invention is described in greater detail in the following description of examples embodying the best mode of the invention, taken in conjunction with drawing FIGS. 1 through 5, in which.

Figure 6:
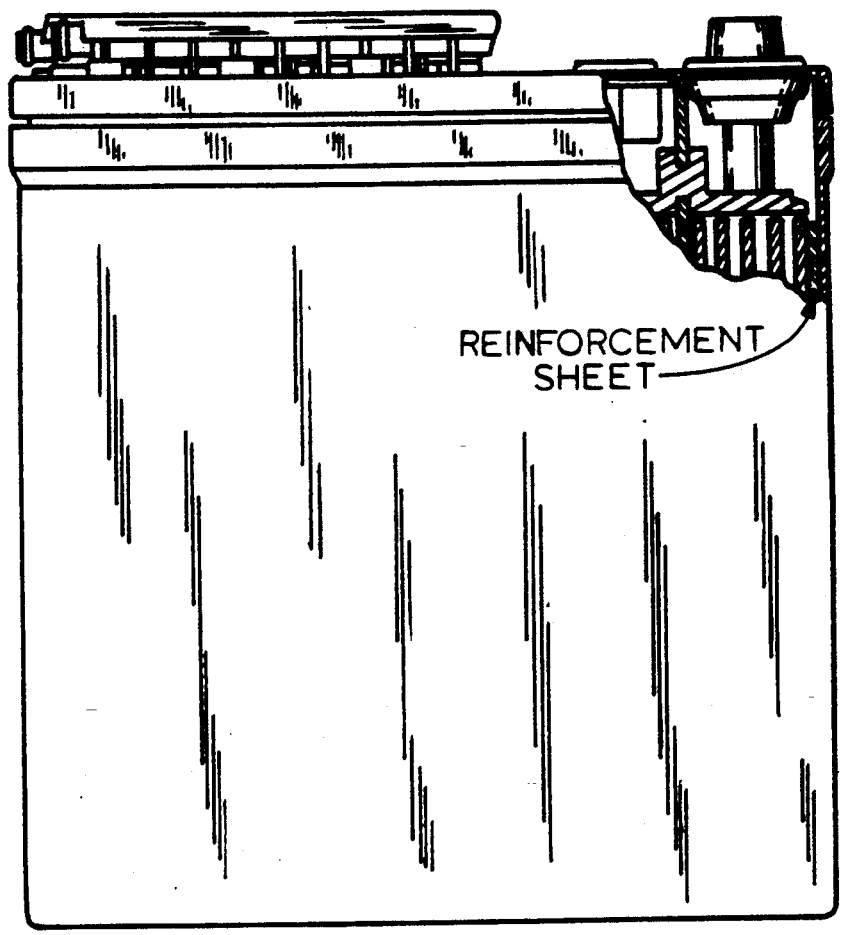

A separate drawing labled as FIG. 6, not in accordance with the present invention, is a front view of the EV2300 battery using reinforcement sheets in accordance with the prior art.

DETAILED DESCRIPTION OF EXEMPLARY EMBODIMENTS

Figure 1:
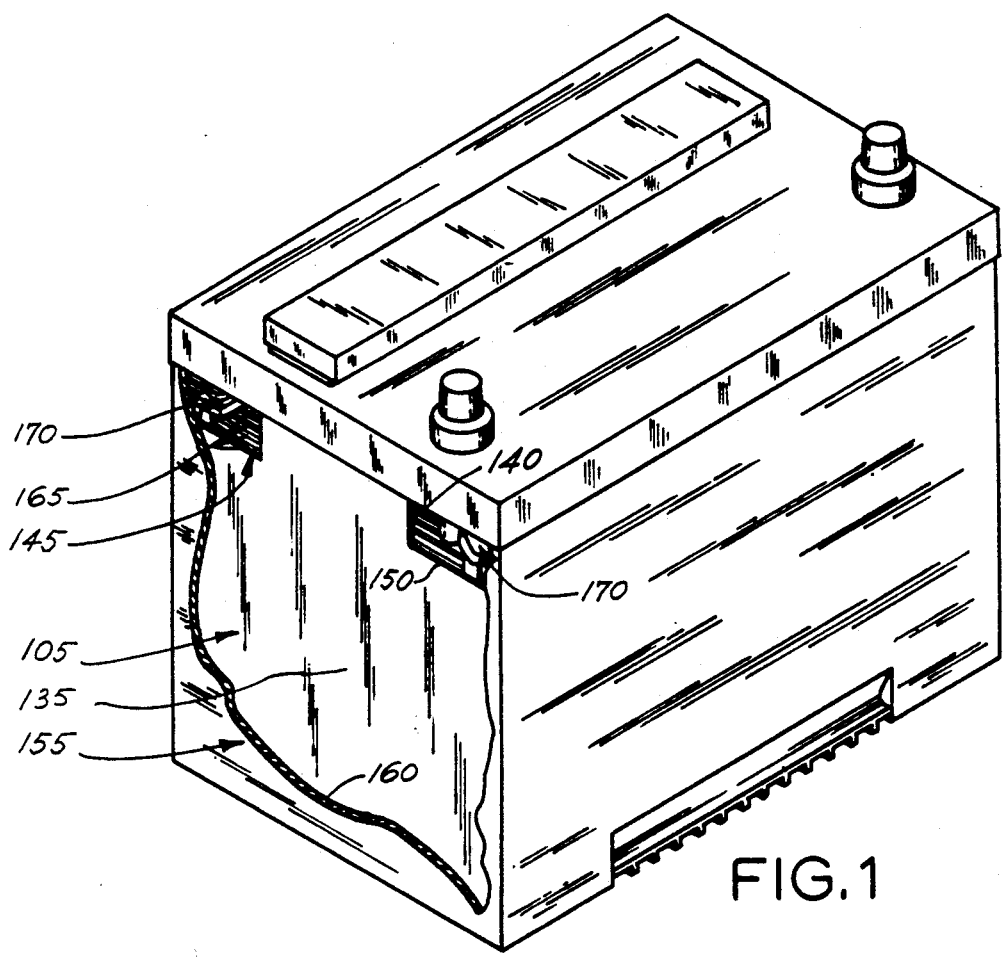
FIG. 1 is a perspective view of the relevant components of a vehicle battery having two straps connecting the elements on the outer portion and utilizing an anti-vibration plaque on each end of the battery in accordance with the present invention.

Referring to FIG. 1, the vehicle battery 100 comprises two anti-vibration plaques 105, one of which is shown in the cutaway view, in accordance with the present invention, each disposed exterior to an end cell element 145 and interior to the corresponding container end wall 155. Each anti-vibration plaque 105 has the shape of the container end wall 155 except for cutout portions 120 located along the top edge 115 which facilitate ease of manufacturing by preventing contact between the plaque 105 and the straps 170 which connect the plates 165 in the end cell elements 145.

The battery 100 is a typical thin-walled polypropylene type in which the present invention is particularly effective. Dimensions of the battery 100 which are important to the present invention are those relating to the size and shape of the container end walls 155, the location of straps 170 employed for connection of end cell elements 145, and the thickness of the space between each container end wall 155 and its corresponding end cell element 145 prior to insertion of the plaque 105.

Figure 2:
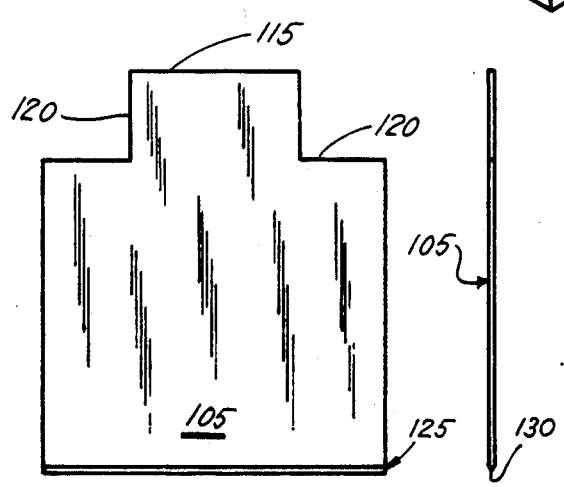
FIG. 2 is a front view of the anti-vibration plaque for a battery in which the straps are located on the outer portion of the elements.

Referring now to FIG. 2, the anti-vibration plaque 105 shown therein, in accordance with the present invention, is shaped for application to vehicle batteries with straps 170 located on the outer portion of the elements.

Figure 3:
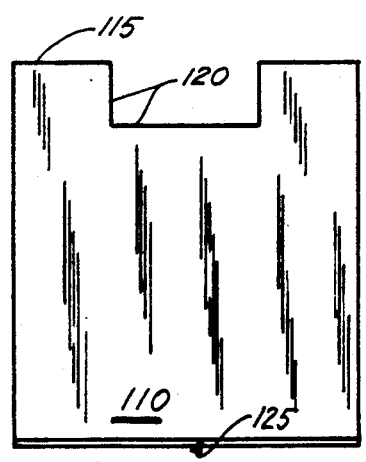
FIG. 3 is a front view of the anti-vibration plaque for a battery in which the straps are located on the inner portion of the elements.

Referring now to FIG. 3, the anti-vibration plaque 110 shown therein, in accordance with the present invention, is shaped for application to vehicle batteries with straps 170 located on the inner portion of the elements.

Each plaque 105 or 110, therefore, provides reinforcement and protects against container end wall flexing by maintaining contact with all but a very small portion of the surface area of the container end wall 155 and the end cell element 145 between which it is inserted.

Depending on the particular battery selected for application of the present invention, the dimensions of the anti-vibration plaques 105 or 110 can be adjusted to accomplish an interference fit which is a snug fit wherein the exterior surface of the plaque 135 and the interior surface of the container end wall 160 are compressed against one another, and the interior surface of the plaque 140 and the exterior surface of the end cell element 150 are compressed against one another. This interference fit is accomplished by manufacturing each plaque 105 or 110 to have a thickness of 0.125 inches±0.005 inches or to be at least 0.025 inches but not more than 0.075 inches greater in thickness than the space between the end cell element 145 and the container end wall 155 into which it is inserted.

Figures 4, 5:
FIG. 4 is a side view of the anti-vibration plaque of FIG. 2.
FIG. 5 is a side view of the anti-vibration plaque of FIG. 3.

Although shown in FIGS. 1, 2, and 3, the bottom edge 125 of the anti-vibration plaque 105 or 110, in accordance with the present invention, is best viewed from the side, as in FIGS. 4 and 5. Said bottom edge 125 is symmetrically tapered, preferably at a 30 degree angle from the vertical plane, starting along a line equally near the bottom of each vertical surface of the plaque 105 or 110 and proceeding inward and downward at said 30 degree angle to the bottom center line 130 of the plaque 105 or 110 such that the bottom edge 125 forms a wedge shape which is capable of insertion between the end cell element 145 and the container end wall 155 of the battery during routine, on-line manufacture.

Each plaque 105 or 110 is sufficiently rigid to attain a flexural modulus of at least 250,000 psi where the flexural modulus is a measure of the stiffness of a material as derived from ASTM test #D790-86. Preferably, the flexural modulus of each plaque 105 or 110 is approximately 400,000 psi. Such a modulus is achieved by the use of 20% glass-filled polypropylene in the preferred embodiment.

Having the characteristics described herein, any properly designed battery in which two anti-vibration plaques 105 or 110 have been installed is capable of passing the SAE "Off-Road" Vibration Specifications without the need for any other means of anchoring the elements. Any such battery is capable of on-production line manufacture wherein the plaques 105 or 110 are inserted during the same process by which the rest of the elements are inserted.

Thus, there has been provided, in accordance with the invention, an anti-vibration plaque for use in a battery that satisfies the aims and advantages set forth above. While the invention has been described in conjunction with specific embodiments thereof, it is evident that many alternatives, modifications, and variations will be apparent to those skilled in the art. For example, certain battery designs include two 12-volt systems within a single container, providing more than two end cell elements which can therefore require more than two plaques in a single container. Accordingly, the invention is intended to embrace all such alternatives, modifications, and variations as fall within the spirit and scope of the appended claims.

We claim:

1. A battery including an anti-vibration plaque and a container enclosing plural battery elements interconnected by straps, said plaque comprising a flat sheet of uniform thickness having rigidity evidenced by a flexural modulus of at least 250,000 psi and having the shape and the interior dimensions of an end wall of said battery except for at least one cutout portion along a top edge positioned to prevent contact between said sheet and any of said straps, said plaque being inserted in a space between an end cell element of the battery and a proximate container end wall during production line battery assembly so as to form an interference fit wherein the thickness of said sheet is at least 0.025 inches but not more than 0.075 inches greater than the width of said space.

2. The battery according to claim 1 wherein the sheet is made of twenty percent glass-filled polypropylene.

3. The battery according to claim 2 wherein the sheet has a flexural modulus of about 400,000 psi.

4. The battery according to claim 1 wherein the sheet has a thickness of 0.125 inches±0.005 inches.

5. The battery according to claim 1 wherein, upon vertical orientation of said sheet, the bottom edge of the sheet is symmetrically tapered starting along a line equally near the bottom edge of each vertical surface of the sheet and proceeding inward and downward at an angle to a bottom center line such that the bottom edge of the sheet forms a wedge shape said sheet being inserted between said end cell element and said container end wall.

6. The battery according to claim 5 wherein the angle of the taper for said bottom edge is 30 degrees from the vertical plane.

7. A battery comprising:
  a. a container enclosing plural battery elements interconnected by straps; and b. at least two anti-vibration plaques, each of said plaques comprising a flat sheet of uniform thickness having rigidity evidenced by a flexural modulus of at least 250,000 psi and having the shape and the interior dimensions of an end wall of said battery except for at least one cutout portion along a top edge positioned to prevent contact between said sheet and any of said straps, each of said plaques being inserted in a space between an end cell element of said battery and a proximate container end wall during production line assembly of said battery so as to form an interference fit wherein the thickness of each said sheet is at least 0.025 inches but not more than 0.075 inches greater than the width of said space.

8. The battery according to claim 7 wherein said sheets are made of twenty percent glass-filled polypropylene.

9. The battery according to claim 8 wherein said sheets each have a flexural modulus of about 400,000 psi.

10. The battery according to claim 7 wherein said sheets each have a thickness of 0.125 inches±0.005 inches.

11. The battery according to claim 7 wherein, upon vertical orientation of said sheets, the bottom edge of each sheet is symmetrically tapered starting along a line equally near the bottom edge of each vertical surface of the sheet and proceeding inward and downward at an angle to a bottom center line such that the bottom edge of the sheet forms a wedge shape said sheets being inserted between each end cell element and its proximate container end wall.

12. The battery according to claim 11 wherein the angle of the taper for the bottom edge of each sheet is 30 degrees from the vertical plane.

* * * * *